US012631152B2

(12) United States Patent
Kuroiwa et al.

(10) Patent No.: US 12,631,152 B2
(45) Date of Patent: May 19, 2026

(54) FUELING TIME BASED ON ENGINE SPEED AND TEMPERATURE

(71) Applicant: YAMABIKO CORPORATION, Tokyo (JP)

(72) Inventors: Minoru Kuroiwa, Tokyo (JP); Ryosuke Imai, Tokyo (JP); Takahiro Yamazaki, Tokyo (JP)

(73) Assignee: YAMABIKO CORPORATION, Tokyo (JP)

( * ) Notice: Subject to any disclaimer, the term of this patent is extended or adjusted under 35 U.S.C. 154(b) by 0 days.

(21) Appl. No.: 18/651,698

(22) Filed: May 1, 2024

(65) Prior Publication Data

US 2024/0369027 A1 Nov. 7, 2024

(30) Foreign Application Priority Data

May 2, 2023 (JP) ................................ 2023-076172

(51) Int. Cl.
*F02D 41/06* (2006.01)
*F02M 1/16* (2006.01)

(52) U.S. Cl.
CPC ............ *F02D 41/062* (2013.01); *F02M 1/16* (2013.01); *F02D 2200/021* (2013.01); *F02D 2200/101* (2013.01)

(58) Field of Classification Search
CPC .. F02D 41/064; F02D 41/062; F02D 2400/06; F02D 2200/021; F02D 2200/101; F02M 1/08; F02M 1/16; F02P 5/1506
See application file for complete search history.

(56) References Cited

U.S. PATENT DOCUMENTS 3,982,503 A * 9/1976 Keranen ............... F02D 41/068 123/179.15
5,134,984 A * 8/1992 Nonaka .................. F02D 41/18 123/478
6,539,916 B2 * 4/2003 Ueda .................. F02D 41/3029 123/305
6,892,700 B2 * 5/2005 Suzuki .................... F02D 37/02 123/339.23
7,000,595 B2 * 2/2006 Andersson ............ F02P 5/1504 123/480
7,813,866 B2 * 10/2010 Demura ................ F02D 41/345 123/491

(Continued)

FOREIGN PATENT DOCUMENTS

DE 3439841 A1 5/1985
JP H08014107 A 1/1996

(Continued)

*Primary Examiner* — Gonzalo Laguarda
(74) *Attorney, Agent, or Firm* — HAUPTMAN HAM, LLP

(57) ABSTRACT

An engine control device that regulates fuel to be supplied to an engine including: a starting fuel supply valve that supplies starting fuel to air to the engine or to an air-fuel mixture of air and fuel in starting the engine; an engine temperature detection unit that detects an engine temperature of the engine; an engine speed detection unit that detects the engine speed of the engine; and a control unit that controls the starting fuel supply valve to open and close to control the engine, in which the control unit controls an opening time of the starting fuel supply valve according to the engine temperature and the engine speed.

7 Claims, 5 Drawing Sheets

X →

Y ↓

| | -30 | -20 | -10 | 0 | 10 | 20 | 30 | 40 | 50 |
|---|---|---|---|---|---|---|---|---|---|
| 0 | 0 | 0 | 0 | 0 | 0 | 0 | 0 | 0 | 0 |
| 500 | 0 | 0 | 0 | 0 | 0 | 0 | 0 | 0 | 0 |
| 1000 | 0 | 0 | 0 | 0 | 0 | 0 | 0 | 0 | 0 |
| 1500 | 0 | 0 | 0 | 0 | 0 | 0 | 0 | 0 | 0 |
| 2000 | 0 | 0 | 0 | 0 | 0 | 0 | 0 | 0 | 0 |
| 2500 | 35 | 30 | 25 | 8 | 2 | 1 | 0 | 0 | 0 |
| 3000 | 42 | 37 | 30 | 12 | 10 | 8 | 3 | 6 | 8 |
| 3500 | 47 | 42 | 33 | 14 | 10 | 8 | 5 | 12 | 15 |
| 4000 | 52 | 47 | 36 | 16 | 13 | 10 | 7 | 18 | 21 |
| 4500 | 57 | 53 | 39 | 18 | 15 | 12 | 8 | 21 | 25 |

X-AXIS : ENGINE TEMPERATURE (°C)

Y-AXIS : ENGINE SPEED (rpm)

VALUE IN CELL (m sec) : SOLENOID VALVE OPENING TIME

(56) References Cited

U.S. PATENT DOCUMENTS

| | | | | |
|---|---|---|---|---|
| 10,550,783 | B2 * | 2/2020 | Coulson | F02D 41/064 |
| 11,313,328 | B2 * | 4/2022 | Ogasawara | F02M 1/10 |
| 11,724,686 | B2 * | 8/2023 | Almkvist | F02P 5/1506<br>701/22 |
| 2005/0279326 | A1 * | 12/2005 | Andersson | F02P 5/1506<br>123/406.47 |
| 2006/0102126 | A1 * | 5/2006 | Nakata | F02M 1/12<br>123/179.15 |
| 2007/0028881 | A1 * | 2/2007 | Nakata | F02M 1/08<br>123/179.15 |
| 2009/0013951 | A1 * | 1/2009 | Nakata | F02M 17/04<br>123/179.14 |
| 2019/0113004 | A1 * | 4/2019 | Ogasawara | F02M 1/10 |

FOREIGN PATENT DOCUMENTS

| | | | |
|---|---|---|---|
| JP | 2003129908 | A | 5/2003 |
| JP | 2016205286 | A | 12/2016 |

* cited by examiner

Fig. 4

X →

Y ↓

| | -30 | -20 | -10 | 0 | 10 | 20 | 30 | 40 | 50 |
|---|---|---|---|---|---|---|---|---|---|
| 0 | 0 | 0 | 0 | 0 | 0 | 0 | 0 | 0 | 0 |
| 500 | 0 | 0 | 0 | 0 | 0 | 0 | 0 | 0 | 0 |
| 1000 | 0 | 0 | 0 | 0 | 0 | 0 | 0 | 0 | 0 |
| 1500 | 0 | 0 | 0 | 0 | 0 | 0 | 0 | 0 | 0 |
| 2000 | 0 | 0 | 0 | 0 | 0 | 0 | 0 | 0 | 0 |
| 2500 | 35 | 30 | 25 | 8 | 2 | 1 | 0 | 0 | 0 |
| 3000 | 42 | 37 | 30 | 12 | 10 | 8 | 3 | 6 | 8 |
| 3500 | 47 | 42 | 33 | 14 | 10 | 8 | 5 | 12 | 15 |
| 4000 | 52 | 47 | 36 | 16 | 13 | 10 | 7 | 18 | 21 |
| 4500 | 57 | 53 | 39 | 18 | 15 | 12 | 8 | 21 | 25 |

X-AXIS : ENGINE TEMPERATURE (℃)

Y-AXIS : ENGINE SPEED (rpm)

VALUE IN CELL (m sec) : SOLENOID VALVE OPENING TIME

FUELING TIME BASED ON ENGINE SPEED AND TEMPERATURE

RELATED APPLICATIONS

The present application claims the benefit of priority from Japanese Patent Application No. 2023-076172, filed on May 2, 2023, the disclosure of which is hereby incorporated by reference herein in its entirety.

BACKGROUND OF THE INVENTION

1. Technical Field

The present invention relates to an engine control device, and more particularly to an engine control device including a starting fuel supply device and an engine control method.

2. Description of the Related Art

An output power of an engine of a handheld engine-driven machine, such as a chain saw, varies depending on variations of a carburetor or an engine and operating conditions (for example, temperature, atmospheric pressure, moisture, and fuel type).

In such an engine-driven machine, it is known that using a choke at the time of starting the engine, particularly when the engine is cold, temporarily increases the air-fuel ratio and facilitates starting.

However, a less-frequent user of the engine-driven machine is not accustomed to this choke operation and, in some cases, causes an operation error and has a spark plug get wet, thereby failing to start the engine-driven machine.

As a problem of the choke system, there has been a tendency to cause an engine stall or acceleration lags due to lean burning at the time of initial acceleration after starting. In such a case, it is known that smooth acceleration is possible by creating a rich air-fuel state in an idle state after starting and before accelerating.

In order to solve these problems, the following prior arts have been proposed.

JP 2016-205286 A proposes an engine control device including a starting fuel supply device capable of increasing the air-fuel ratio using a solenoid valve without using choke.

JP H08-014107 A proposes a starting fuel supply device in which a carburetor enrichment circuit that generates a rich starting air-fuel mixture of air and fuel and supplies it on the lower side of a throttle valve of an intake path is provided in a carburetor main body. In starting an engine, an opening time of an electromagnetic on-off valve that opens and closes the carburetor enrichment circuit is controlled according to an atmospheric temperature and an elapsed time after stopping of the engine.

Moreover, JP 2003-129908 A proposes a fuel temperature control device that includes a plurality of control maps that are each set in advance for a composition of a plurality of types of fuels and each define a relation between on/off of an electromagnetic switching valve and a current fuel temperature for setting the fuel viscosity to a certain state. The fuel temperature control device selects a control map according to the composition of the fuel to be used, and controls a fuel temperature adjustment unit on the basis of the map so that the fuel to be used have a temperature stored in advance.

However, the conventional engine control devices as described above have the following problems.

In the conventional engine control device according to JP 2016-205286 A, the opening degree of the solenoid valve of the carburetor is controlled to increase the air-fuel ratio without using the choke, but this configuration causes an unstable idle state immediately after starting.

Therefore, the starting fuel supply device according to JP H08-014107 A controls the opening time of the electromagnetic on-off valve that opens and closes the carburetor enrichment circuit when the engine starts in accordance with the atmospheric temperature and the elapsed time after stopping of the engine: the opening time of the electromagnetic on-off valve is controlled to output a suitable amount of fuel depending on the temperature to achieve a stable idle operation in the idle state immediately after starting.

However, this starting fuel supply device has a problem as follows: setting a valve opening time to create a rich air-fuel state may cause an excessively rich air-fuel state depending on the type of fuel, resulting in an engine stop.

In addition, when the valve opening time is set based on a fuel type that is likely to create a rich air-fuel state, the starting fuel supply device has problems as follows: an engine stall or acceleration lags may occur because the air-fuel mixture becomes excessively lean; and when a fuel that is likely to cause lean burning is used, the starting fuel supply device may be affected by conditions such as atmospheric pressure.

To solve these problems, the fuel temperature control device according to JP 2003-129908 A is provided a plurality of control maps that define a relation between on/off of an electromagnetic switching valve and a current fuel temperature for setting a fuel viscosity to a certain state to each composition of a plurality of types of fuel; it controls a fuel temperature adjustment unit on the basis of the map so that the fuel to be used reaches a temperature stored in advance by selecting a control map according to the composition of the fuel to be used.

However, this fuel temperature control device may cause a change in engine speed due to a slight change such as a rich air-fuel state and lean burning, or cause an unstable state immediately after starting, thereby failing to accelerate smoothly.

Furthermore, a change in the atmospheric pressure or the like as well as a change in the fuel type may cause an unsuccessful supply of appropriate amount of fuel.

The conventional engine control devices described above further have the following problems.

Normally, the air-fuel mixture is relatively rich at high temperature, but vapor lock may occur that is a phenomenon in which the fuel passage is blocked by bubbles generated by vaporization of liquid fuel in a fuel delivery system by heat from the surroundings, thereby blocking the fuel flow. When vapor lock occurs, fuel supply is stopped and the air-fuel mixture becomes excessively lean, and problems such as idling malfunction occur.

The present invention has been made in view of the above-described conventional problems, and an object of the present invention is to provide an engine control device and an engine control method that enable, even when a fuel type, atmospheric pressure, or the like changes, constant supply of an appropriate amount of fuel by setting a opening time of a starting fuel supply valve according to the engine speed as well as the engine temperature.

Another object of the present invention is to provide an engine control device and an engine control method that enable, even in a high-temperature and high-speed range in which vapor lock tends to occur, stable idle speed to be maintained by setting a long opening time of the starting fuel supply valve when the engine temperature is high and the engine speed is in a high engine speed range.

SUMMARY OF THE INVENTION

In order to achieve the objects above, an engine control device according to the present invention regulates fuel to be supplied to an engine. The engine control device includes a starting fuel supply valve that supplies starting fuel to air to the engine or to an air-fuel mixture in starting the engine, an engine temperature detection unit that detects the temperature of the engine, an engine speed detection unit that detects the engine speed of the engine, and a control unit that controls the starting fuel supply valve to open and close to control the engine. The control unit controls an opening time of the starting fuel supply valve according to the engine temperature and the engine speed.

Furthermore, an engine control method according to the present invention is regulating fuel to be supplied to an engine by an engine control device; the engine control device includes a starting fuel supply valve that supplies starting fuel to air to the engine or to an air-fuel mixture in starting the engine, an engine temperature detection unit that detects the temperature of the engine, an engine speed detection unit that detects the engine speed of the engine, and a control unit that controls the starting fuel supply valve to open and close to control the engine. The engine control method includes four steps. The first step is starting the engine toward a targeted idle speed by the control unit. Second, acquiring the engine speed from the engine speed detection unit and the engine temperature from the engine temperature detection unit by the control unit. Third, reading out information in a setting map of an opening time of the starting fuel supply valve based on the engine speed and the engine temperature by the control unit. Then, controlling the starting fuel supply valve to open based on the opening time of the starting fuel supply valve in the read-out setting map by the control unit.

By the present invention, an engine can be a stable idle state immediately after starting, and even when the valve opening time is set to become a rich air-fuel state, it is possible to prevent to be an excessively rich air-fuel state. Also, even when fuel that tends to cause lean burning is used, it is possible to prevent an engine stall or acceleration lags caused by an excessively lean air-fuel mixture.

In addition, the engine can accelerate smoothly without both changing the engine speed due to a slight change of a rich air-fuel state or lean burning and becoming unstable immediately after starting. It is also possible to supply an appropriate amount of fuel even when atmospheric pressure or the like changes as well as a fuel type.

BRIEF DESCRIPTION OF THE DRAWINGS

FIG. 4 is a table of a setting map of a opening time of a starting fuel supply valve illustrated in FIG. 1.

DETAILED DESCRIPTION

Hereinafter, embodiments of an engine control device and an engine control method according to the present invention will be described with reference to the accompanying drawings.

In the present embodiment, a starting fuel supply device that regulates fuel to be supplied to an engine in starting the engine will be described as an embodiment of the engine control device. However, as described later, the present invention is not limited to the starting fuel supply device, and it can be implemented in an engine control device and a fuel control device other than a starting control device.

The starting fuel supply device according to an embodiment of the present invention configures a part of an intake system of an engine mounted mainly on a portable engine-driven machine, and it is used in combination with a carburetor that supplies a mixture of fuel and air to the engine.

Examples of engine-driven machines including the starting fuel supply device of the present invention are such as a chain saw, a brush cutter, a power cutter, a hedge trimmer, and a power blower: these are equipped with a small air-cooled two-cycle internal combustion engine as a power source.

Figure 1:
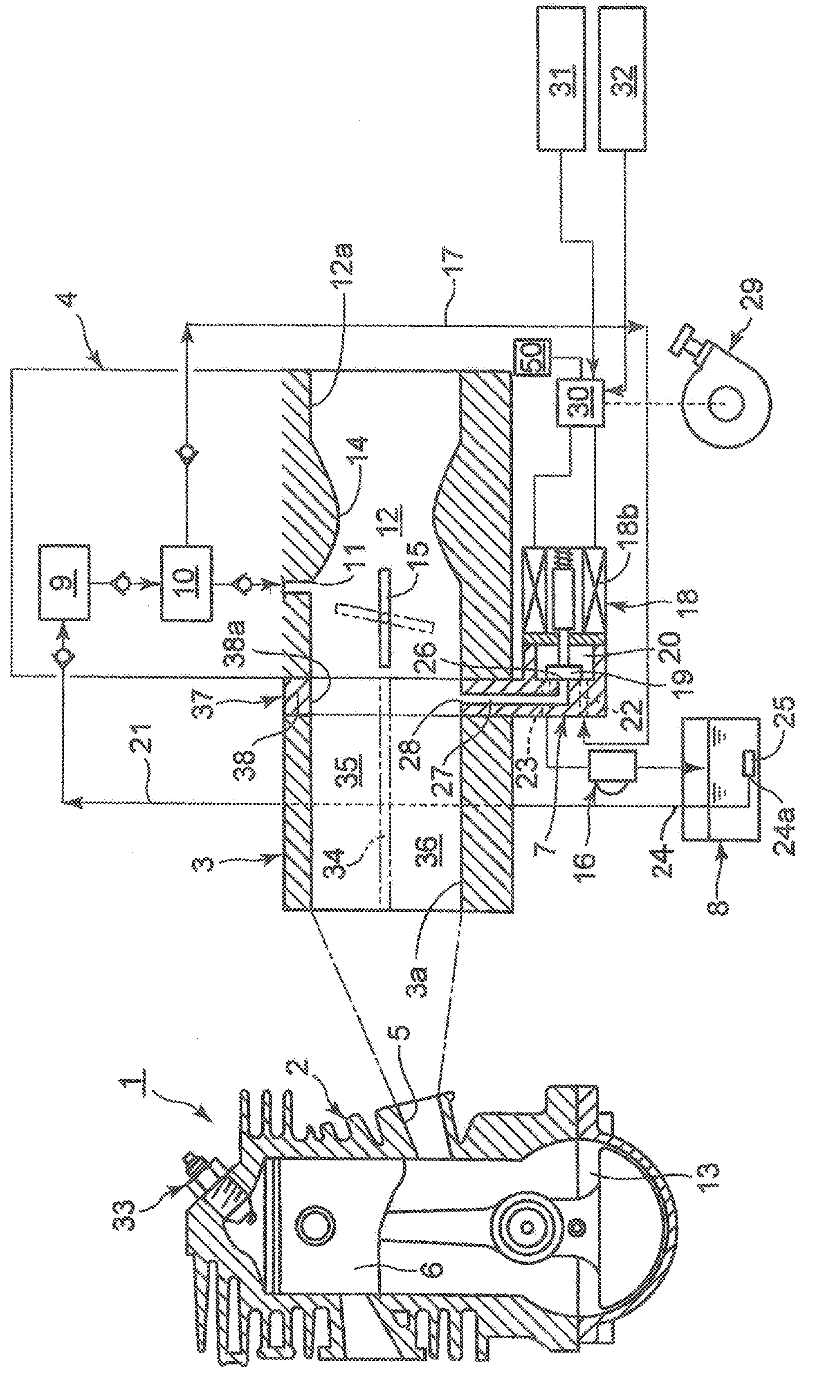
FIG. 1 is a schematic view for illustrating a fuel passage of a starting fuel supply device according to an embodiment of the present invention.

FIG. 1 is a schematic view for illustrating a fuel passage of a starting fuel supply device 7 according to an embodiment of the present invention.

As illustrated in FIG. 1, a carburetor 4 is connected to a cylinder block 2 configuring an engine 1 via an intake pipe 3 having a heat insulating property.

Air purified by an air cleaner (not illustrated) is mixed with fuel in the carburetor 4, and an air-fuel mixture is generated. The air-fuel mixture is drawn in the cylinder block 2 through the intake pipe 3 and an intake port 5. The generation of the air-fuel mixture in the carburetor 4 and the intake of the air-fuel mixture to the cylinder block 2 are performed by the operation of a piston 6 that reciprocally slides in the cylinder block 2.

In addition, the cylinder block 2 is provided with a spark plug 33. A voltage generated by an ignition coil of an ignition control circuit attached to an upper side surface of the cylinder block 2 is applied to the spark plug 33 by an operation of a recoil starter 29 for starting the engine 1. Therefore, the air-fuel mixture in a combustion chamber burns, and the piston 6 oscillates.

Although the type of the carburetor 4 used in combination with the starting fuel supply device 7 of the present invention is not limited, a diaphragm carburetor having a known configuration is preferable as a carburetor suitable for a portable engine-driven machine used in frequently changing directions of the machine body during work.

As illustrated in FIG. 1, the carburetor 4 includes a fuel pump 9 connected to a fuel tank 8 of an engine-driven machine via a check valve, a fuel chamber 10 connected to the fuel pump 9 via a check valve, and a main fuel discharge port 11 connected to the fuel chamber 10 via a check valve. The main fuel discharge port 11 opens to an intake path 12 of the carburetor 4.

The fuel pump 9 is preferably a pulse-controlled diaphragm pump driven by a pressure pulse generated by a crank chamber 13 of the engine 1. The fuel pump 9 sucks fuel from the fuel tank 8 and supplies the fuel to the fuel chamber 10. Due to a pressure drop in the intake path 12 caused by a venturi 14, the fuel in the fuel chamber 10 is sucked and discharged from the main fuel discharge port 11 into the intake path 12. When an operator operates an output operation member (not illustrated) of the engine-driven machine, the opening degree of a throttle valve 15 in the intake path 12 is adjusted, and an engine power corresponding to the opening degree of the throttle valve 15 is output.

The starting fuel supply device 7 according to the present embodiment includes a starting fuel supply valve 18 that automatically adds starting fuel to the air-fuel mixture generated by the carburetor 4 or to the air that has passed through the carburetor 4. The starting fuel supply device 7 also includes a valve chamber 20 that accommodates a valve element 19 of the starting fuel supply valve 18.

A manual pump 16 is also provided to the starting fuel supply valve 18. The manual pump 16 is provided to return the fuel from the starting fuel supply valve 18 to the fuel tank 8. Also, the operation of the manual pump 16 allows the fuel in the fuel chamber 10 to move into the fuel tank 8 via the valve chamber 20.

As illustrated in FIG. 1, in the present embodiment, a suction passage 21 from the fuel tank 8 to the fuel pump 9 of the carburetor 4 is provided, and the valve chamber 20 is disposed in a middle of a flow passage 17 from the fuel chamber 10 to the manual pump 16.

In the present embodiment, the valve chamber 20 is disposed at a position below the intake path 12 of the carburetor 4 in the storage state of the engine-driven machine including the engine 1. A fuel inlet 22 and a fuel outlet 23 connect to the valve chamber 20, the fuel inlet 22 connects to the fuel chamber 10 via the flow passage 17, and the fuel outlet 23 connects to the fuel tank 8 via the manual pump 16.

The suction passage 21 from the fuel tank 8 to the fuel pump 9 of the carburetor 4 connects to the fuel tank 8 via a suction tube 24. A suction end 24*a* of the suction tube 24 is located at the bottom in the fuel tank 8, and a filter 25 for preventing suction of dust is provided to the suction end 24*a*.

An orifice (valve seat or passage hole) 26 is opened in the valve chamber 20, and the orifice 26 connects to an air-fuel mixture path 36 of the intake pipe 3 via a starting fuel discharge passage 27 and a starting fuel discharge port 28 (when an air path 35 of the intake pipe 3 is disposed on the lower side, the orifice 26 may connect to the air path 35).

The orifice 26 is normally closed by the valve element 19 of the starting fuel supply valve 18 except in starting the engine. The starting fuel supply valve 18 is opened only upon starting the engine, and this opens the orifice 26. The starting fuel discharge port 28 opens to the intake path 12 on the downstream side of the venturi 14.

The starting fuel supply valve 18 is electrically controllable, and for example, a solenoid valve (electromagnetic valve) is used. As a power source 50 of the starting fuel supply valve 18, a generator, a battery, and the like mounted on the engine-driven machine can be used.

A control unit 30 is provided to control the starting fuel supply valve 18 of the starting fuel supply device 7 using an electromagnetic coil 18*b*. An engine speed detection unit 31 that detects the engine speed of the engine 1 and an engine temperature detection unit 32 that detects an engine temperature are connected to the control unit 30.

The operation of the starting fuel supply valve 18 is controlled by the control unit 30, and the control unit 30 controls the opening time of the starting fuel supply valve 18 on the basis of the engine speed from the engine speed detection unit 31 and the engine temperature from the engine temperature detection unit 32 to constantly supply an appropriate amount of fuel.

The starting fuel supply valve 18 used in the present embodiment is a normally closed mechanism configured to open the starting fuel supply valve 18 in accordance with an energization instruction from the control unit 30. To the contrary, if the starting fuel supply valve 18 is a normally open mechanism that opens the valve in a power-off state, the present invention can be applied by reversing the switching between energization and de-energization.

Here, for example, the engine speed detection unit 31 may detect the engine speed by a detection object such as a magnet provided on the flywheel of the engine 1.

In addition, for example, the engine temperature detection unit 32 may detect the engine temperature by a temperature sensor disposed on a substrate of the ignition control circuit of the ignition coil 33 of the engine 1.

Figure 2:
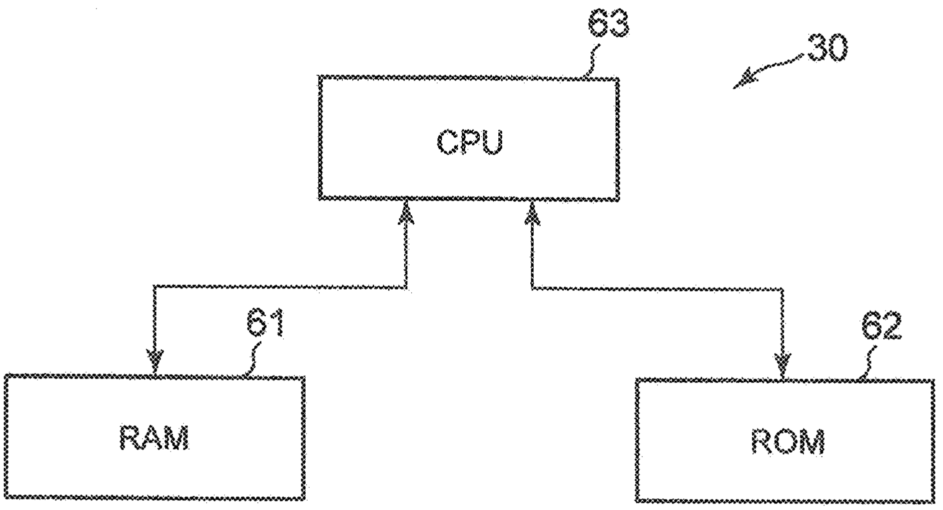
FIG. 2 is a block diagram for illustrating an internal configuration of a control unit illustrated in FIG. 1.

FIG. 2 is a block diagram for illustrating an internal configuration of the control unit 30 illustrated in FIG. 1.

As illustrated in FIG. 2, the control unit 30 is configured with microcomputers including RAM 61, ROM 62, and CPU 63. The control unit 30 is configured to control the engine by controlling the opening-closing operation of the starting fuel supply valve 18 of the starting fuel supply device 7 at the time of starting the engine 1 according to an engine control program stored in ROM 62 as described later.

In ROM 62 or RAM 61, information of a setting map of the opening time of the starting fuel supply valve 18 for controlling the engine described above is stored together with the engine control program. That is, the opening time of the starting fuel supply valve 18 set to correspond to the engine speed from the engine speed detection unit 31 and the engine temperature from the engine temperature detection unit 32 is written in the setting map.

The information of the setting map of the opening time of the starting fuel supply valve 18 may be stored in RAM 61.

As will be described later, the first aspect of the present invention is that the engine 1 is controlled by detecting the engine temperature and the engine speed of the engine 1 and controlling the opening time of the starting fuel supply valve 18 according to the engine temperature and the engine speed of the engine 1 to constantly supply an appropriate amount of fuel.

Furthermore, as will be described later, the second aspect of the present invention is that the opening time of the starting fuel supply valve 18 of the starting fuel supply device 7 is extended in a high-temperature and high-speed range.

Figure 3:
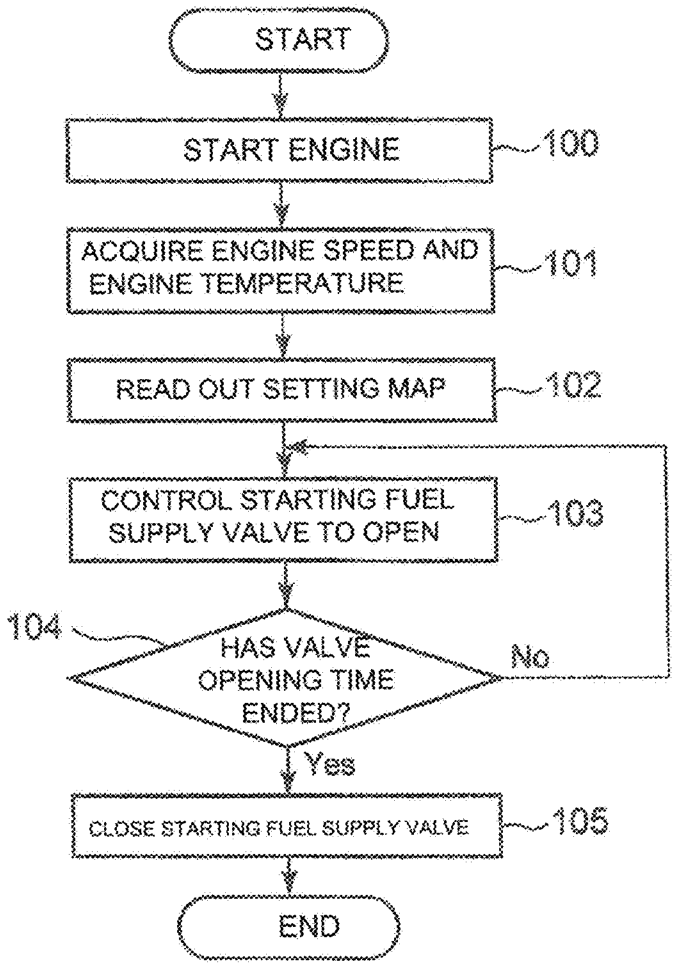
FIG. 3 is a flowchart of an engine control method performed by the starting fuel supply device illustrated in FIG. 1.

FIG. 3 is a flowchart of an engine control method performed by the starting fuel supply device 7 illustrated in FIG. 1. Hereinafter, the engine control method performed by the starting fuel supply device 7 in starting the engine 1 will be described with reference to FIG. 3.

First, in step 100, when an operator operates the recoil starter 29, the electromagnetic coil 18*b* of the starting fuel supply valve 18 is excited by the control unit 30 based on an output signal of the primary coil of a flywheel magnet. Then, the starting fuel supply valve 18 is opened, and the engine 1 is started toward a targeted idle speed.

Here, for example, in a special environment in which the idle operation is likely to be unstable such as in a very high temperature or low temperature, the idle ignition timing may be controlled by a PID controller in addition to or independently from the fuel supply control described in the present invention.

In step 101, CPU 63 of the control unit 30 acquires the engine speed of the engine 1 from the engine speed detection unit 31 and the engine temperature of the engine 1 from the engine temperature detection unit 32 according to the engine control program stored in ROM 62.

In the present embodiment, the engine speed detection unit 31 is configured to detect the engine speed by, for example, a detection object such as a magnet provided on the flywheel of the engine 1. Also, the engine temperature detection unit 32 is configured to detect the engine temperature by, for example, a temperature sensor disposed on a substrate of the ignition control circuit of the ignition coil 33 of the engine 1.

In step 102, CPU 63 of the control unit 30 reads out information in the setting map of the opening time of the starting fuel supply valve 18 based on the engine speed and the engine temperature of the engine 1 from ROM 62 or RAM 61.

FIG. 4 is a table of the setting map of the opening time of the starting fuel supply valve 18 illustrated in FIG. 1. Here, in this table, the X-axis represents the engine temperature, the Y-axis represents the engine speed (rpm) of the engine 1, and the numerical value in each cell represents the opening time (msec) of the starting fuel supply valve 18.

Thus, for example, when the engine speed of the engine 1 is 2500 rpm and the engine temperature is −10° C., the valve opening time of 25 msec is read out as information in the setting map.

Figure 5:
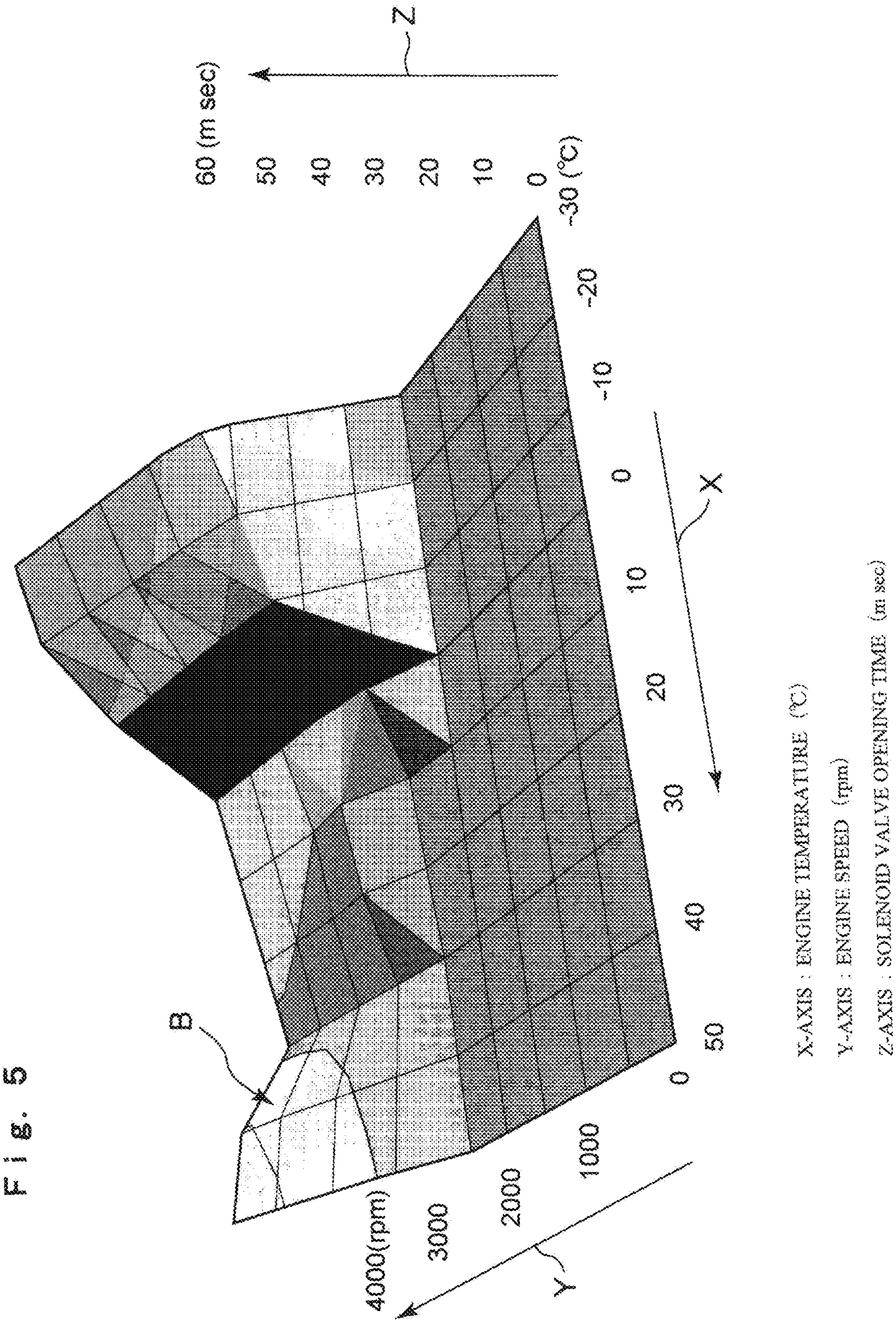
FIG. 5 is a three-dimensional graph for illustrating a part of the table of the setting map of the opening time of the starting fuel supply valve illustrated in FIG. 4.

FIG. 5 is a three-dimensional graph for illustrating a part of the table of the setting map of the opening time of the starting fuel supply valve 18 illustrated in FIG. 4.

The information of the opening time of the starting fuel supply valve 18 illustrated in the table of FIG. 4 and the graph of FIG. 5 is an example, and different numerical values are set according to the type of the engine, the characteristics of the starting fuel supply device, and the like. That is, different setting maps are prepared according to the type of the engine, the characteristics of the starting fuel supply device, and the like.

As can be seen from the table of FIG. 4 and the graph of FIG. 5, in the present embodiment, the engine speed of the engine 1 ranges from 0 to 4500 rpm and the opening time of the starting fuel supply valve 18 is set to 0 msec regardless of the engine temperature in a low engine speed region at or lower than a predetermined medium speed of 2000 rpm. In this region (at or lower than a medium engine speed), the starting fuel supply valve 18 is in a closed state.

Generally, when the engine speed is the predetermined medium speed or lower, the engine speed decreases as the air-fuel mixture becomes rich. When the engine speed decreases to a certain speed or lower because the air-fuel mixture becomes rich, the operation may become unstable or stop. Therefore, in this region (at or lower than a medium engine speed), the starting fuel supply valve 18 is set in a closed state, thereby preventing a decrease in the engine speed.

In addition, when the engine speed of the engine 1 is equal to or higher than the predetermined medium speed of 2000 rpm, the opening time of the starting fuel supply valve 18 is set to extend as the engine speed increases; the opening time of the starting fuel supply valve 18 is set to extend as the engine temperature decreases.

That is, when the engine speed is equal to or higher than the predetermined medium speed, the engine speed is more stable than when the engine speed is low. By increasing the fuel supply as the engine speed increases, the engine speed is more stable, and the acceleration performance is improved. Thus, a longer opening time of the starting fuel supply valve 18 is set.

In addition, the engine speed generally increases as the engine temperature decreases, and thus more amount of fuel supply is required than when the temperature is high. In order to accurately cope with this situation, a longer opening time of the starting fuel supply valve 18 is set as described above.

However, in a high-temperature and high-speed range as described in the second aspect of the present invention, that is, in the present embodiment, when the engine speed of the engine 1 is equal to or higher than a predetermined engine speed of 3000 rpm and the engine temperature is equal to or higher than a predetermined temperature of 30° C., the opening time of the starting fuel supply valve 18 is set to extend as the engine speed increases and the engine temperature increases. This corresponds to a region indicated by B in FIG. 5.

As described above, high engine temperature and high engine speed means that the engine has already been started smoothly and the operation is stable. In this state, the opening time of the starting fuel supply valve 18 can be set to extend as the engine temperature increases, and a sufficient engine power is output.

In step 103, CPU 63 of the control unit 30 controls the starting fuel supply valve 18 to open based on the opening time of the starting fuel supply valve 18 that is the information in the setting map read out as described above.

As described above, as the first aspect of the present invention, it is possible to constantly supply an appropriate amount of fuel even when the fuel type, the atmospheric pressure, and the like changes by setting the opening time of the starting fuel supply valve 18 according to the engine speed of the engine 1 as well as the engine temperature.

In addition, although the engine speed temporality decreases in a rich air-fuel state due to a change in the fuel type or the like, the starting fuel supply valve 18 is set to supply a smaller amount of fuel, thereby increasing the engine speed to an appropriate speed. Conversely, although the engine speed temporality increases in a lean air-fuel state, the starting fuel supply valve 18 is set to supply a larger amount of fuel, thereby decreasing the engine speed to an appropriate speed.

As the second aspect of the present invention, a long opening time of the starting fuel supply valve 18 is set when the engine temperature is high and the engine speed is in a high engine speed range in the setting map of the opening time of the starting fuel supply valve 18.

That is, in the table of the setting map of the opening time of the starting fuel supply valve 18 illustrated in FIG. 4, for example, when the engine temperature is 40° C. and the engine speed is 3500 rpm, the opening time of the starting fuel supply valve 18 is set to 12 msec; when the engine temperature is 50° C. and the engine speed is 3500 rpm, the opening time of the starting fuel supply valve 18 is set to 15 msec.

As described above, by setting a long opening time of the starting fuel supply valve 18 when the engine temperature is high and the engine speed is in a high engine speed range, stable idle speed can be maintained even when vapor lock occurs.

Here, vapor lock is a phenomenon in which the fuel passage is blocked by bubbles generated by vaporization of liquid fuel in a fuel delivery system by heat from the surroundings, thereby blocking the fuel flow. Normally, the air-fuel mixture is relatively rich at high temperature, but when vapor lock occurs, the fuel supply is stopped and the air-fuel mixture becomes excessively lean, and problems such as idling malfunction occur.

However, as described above, the setting map is set to have a long opening time of the starting fuel supply valve 18 when the engine temperature is high and the engine speed is in a high engine speed range. If a lean air-fuel state occurs and the engine speed increases, the long valve opening time resolves the lean air-fuel state and the engine speed is stabilized. In addition, since the fuel supply in a low engine speed range is reduced, there is no concern of excessively rich air-fuel state when vapor lock does not occur.

Furthermore, as a third aspect of the present invention, a long opening time of the starting fuel supply valve 18 is set when the engine temperature is low and the engine speed is in a high engine speed range in the setting map of the opening time of the starting fuel supply valve 18.

That is, in the table of the setting map of the opening time of the starting fuel supply valve 18 illustrated in FIG. 4, for example, when the engine temperature is 0° C. and the engine speed is 4000 rpm, the opening time of the starting fuel supply valve 18 is set to 16 msec; when the engine temperature is −20° C. and the engine speed is 4000 rpm, the opening time of the starting fuel supply valve 18 is set to 47 msec.

When the engine is completely cooled, the startability generally deteriorates. The startability is improved by temporarily generating a rich air-fuel state, but stability in engine speed is impaired if the air-fuel state is too rich. In order to maintain this balance accurately, the opening time of the starting fuel supply valve 18 is set to extend as the engine temperature decreases when the engine temperature is low and the engine speed is in a high engine speed range. As a result, engine start is ensured when the engine is cold and at the same time a rich air-fuel state can be avoided by setting the valve opening frequency according to the temperature.

The information in the setting map of the opening time of the starting fuel supply valve 18 illustrated in FIG. 4 is an example, and it is set according to the type of the engine, the characteristics of the starting fuel supply device, and the like.

For example, a setting map including certain information is stored in a certain engine, and in another type of engine, a setting map including different information from the certain setting map is stored.

In step 104, CPU 63 of the control unit 30 determines whether the opening time of the starting fuel supply valve 18 in the setting map has ended. If the opening time of the starting fuel supply valve 18 has ended, CPU 63 of the control unit 30 closes the starting fuel supply valve 18 in step 105.

When the opening time of the starting fuel supply valve 18 in the setting map has not ended in step 104, the process returns to step 103.

As described above, the embodiment of the present invention makes it possible to constantly supply an appropriate amount of fuel even when the fuel type, the atmospheric pressure, and the like changes by setting the opening time of the starting fuel supply valve 18 according to the engine speed of the engine 1 as well as the engine temperature.

Furthermore, a long opening time of the starting fuel supply valve 18 is set in the setting map when the engine temperature is high and the engine speed is in a high engine speed range. Therefore, stable idle speed can be maintained even when vapor lock occurs.

The maximum opening time of the starting fuel supply valve in the present embodiment is about 300 msec, and the range to be adjusted corresponds to 0 to 20% of this valve opening time. Thus, the amount of fuel supply is finely and accurately adjusted by adjusting a very slight valve opening time.

Although the embodiment has been described, it should not be understood that the description and the drawings constituting a part of this disclosure are limited. Various embodiments and the like not described herein are included.

In the embodiment of the present invention, the information in the setting map of the opening time of the starting fuel supply valve 18 illustrated in FIG. 4 is set and stored, but this is an example. The setting map which is set according to the type of the engine, the characteristics of the starting fuel supply device, and the like may be stored.

In the embodiment of the present invention, the engine temperature and the engine speed of the engine 1 are detected, and the opening time of the starting fuel supply valve 18 is controlled according to the engine temperature and the engine speed of the engine 1 to constantly supply an appropriate amount of fuel. However, in a special environment in which idle operation may be unstable such as in a very high temperature or low temperature, idle ignition timing may be controlled by a PID controller, for example, in addition to the control of the opening time of the starting fuel supply valve 18.

A temperature sensor is disposed on a substrate of the ignition control device of the ignition coil 33 of the engine 1 to detect the engine temperature, and the opening time of the starting fuel supply valve 18 is controlled according to the engine temperature and the engine speed of the engine 1 in the embodiment of the present invention. However, the fuel temperature may be detected by a fuel temperature detection unit provided in the passage 21 for sucking up fuel from the fuel tank 8 to the fuel pump 9 of the carburetor 4 instead of the engine temperature, and the opening time of the starting fuel supply valve 18 may be controlled according to the fuel temperature and the engine speed of the engine 1.

In this case, the numerical information of the opening time of the starting fuel supply valve 18 illustrated in FIGS. 4 and 5 changes.

What is claimed is:

1. An engine control device that regulates fuel to be supplied to an engine, the engine control device comprising: a starting fuel supply valve that supplies starting fuel to air to the engine or to an air-fuel mixture of air and fuel in starting the engine; an engine temperature detection unit that detects the temperature of the engine; an engine speed detection unit that detects the engine speed of the engine; and a control unit that controls the starting fuel supply valve to open and close to control the engine, wherein the control unit controls an opening time of the starting fuel supply valve according to the engine temperature and the engine speed, wherein the opening time is a time duration in which the starting fuel supply valve is open, and the control unit is configured to, in response to the engine temperature being equal to 0° C. or lower and the engine speed being equal to or higher than 2500 rpm, control the opening time of the starting fuel supply valve to extend as the engine temperature decreases, and in response to the engine speed being equal to or lower than 2000 rpm, control the starting fuel supply valve to be closed, in response to the engine temperature being equal to or higher than 30° C and the engine speed being equal to or higher than 3000 rpm, control the opening time of the starting fuel supply valve to extend as (i) the engine speed increases or (ii) the engine temperature increases.

2. The engine control device according to claim 1, wherein the control unit stores a setting map in which the opening time of the starting fuel supply valve is written; the valve opening time being set to correspond to the engine speed detected by the engine speed detection unit and the engine temperature detected by the engine temperature detection unit, and the control unit controls the opening time of the starting fuel supply valve based on the setting map.

3. The engine control device according to claim 2, wherein the opening time of the starting fuel supply valve is set in the setting map to extend as the engine temperature increases when the engine temperature is high and the engine speed is in a high engine speed range.

4. The engine control device according to claim 1, wherein the control unit is configured to, in response to the engine speed being equal to or higher than 2000 rpm, control the opening time of the starting fuel supply valve to extend as the engine speed increases.

5. An engine control method of regulating fuel to be supplied to an engine, the engine control method performed by an engine control device including a starting fuel supply valve that supplies starting fuel to air to the engine or to an air-fuel mixture of air and fuel in starting the engine, an engine temperature detection unit that detects the temperature of the engine, an engine speed detection unit that detects the engine speed of the engine, and a control unit that controls the starting fuel supply valve to open and close to control the engine, the engine control method comprising: starting, the engine toward a targeted idle speed by the control unit; acquiring, the engine speed from the engine speed detection unit and the engine temperature from the engine temperature detection unit by the control unit; reading out, information in a setting map of an opening time of the starting fuel supply valve based on the engine speed and the engine temperature by the control unit, wherein the opening time is a time duration in which the starting fuel supply valve is open; and controlling, the starting fuel supply valve to open based on the opening time of the starting fuel supply valve in the read-out setting map by the control unit, wherein in response to the engine temperature being equal to 0 0C or lower and the engine speed being equal to or higher than 2500 rpm, the opening time of the starting fuel supply valve is set in the setting map to extend as the engine temperature decreases, and in response to the engine speed being equal to or lower than 2000 rpm, the starting fuel supply valve is set in the setting map to be closed wherein in response to the engine temperature being equal to or higher than 30°C and the engine speed being equal to or higher than 3000 rpm, the opening time of the starting fuel supply valve is set in the setting map to extend as (i) the engine speed increases or (ii) the engine temperature increases.

6. The engine control method according to claim 5, wherein the opening time of the starting fuel supply valve is set in the setting map to extend as the engine temperature increases when the engine temperature is high and the engine speed is in a high engine speed range.

7. The engine control method according to claim 5, wherein in response to the engine speed being equal to or higher than 2000 rpm, the opening time of the starting fuel supply valve is set in the setting map to extend as the engine speed increases.

* * * * *